Aug. 19, 1969 J. R. COLSTON 3,461,895

FLUID PRESSURE ATTENUATOR

Filed May 20, 1966

INVENTOR,
JOHN R. COLSTON

Hurvitz & Rose

United States Patent Office 3,461,895
Patented Aug. 19, 1969

3,461,895
FLUID PRESSURE ATTENUATOR

John R. Colston, Silver Spring, Md., assignor to Bowles Engineering Corporation, Silver Spring, Md., a corporation of Maryland Filed May 20, 1966, Ser. No. 551,782
Int. Cl. F15c 1/14
U.S. Cl. 137—81.5 18 Claims

ABSTRACT OF THE DISCLOSURE

A fluid pressure attenuator of the jet recovery type comprises a flat cylindrical chamber having one vented open end and one closed end, an input port and an output port disposed in diametric alignment across the chamber and arranged adjacent the closed end of the chamber so that a fluid stream flowing between said ports flows along the wall defining the closed chamber end. A restricted channel connected to the input port is responsive to an input pressure signal to issue a stream into said chamber, the stream spreading within said chamber in all directions parallel to and away from the closed endwall. The output port is sufficiently small to receive only a portion of the spread stream, the fluid not received being vented through the open chamber end.

The present invention relates to fluid pressure attenuators and, more particularly, to a fluid pressure attenuation device having substantially linear attenuation characteristics over a large range of pressures.

Pure fluid circuits for control purposes are desirably miniaturized so that the operating power required is kept at a minimum and so that a complete operating pure fluid circuit can be placed in small packages. The pure fluid amplifiers and other operating components of such a pure fluid circuit are thus necessarily very small, which in turn, of course, means that the fluid streams generated within the components are of minute size due to the size of the nozzles. Further, these streams must be of a size comparable to the size of the interaction region in a pure fluid operating device to prevent swamping of said interaction region which would make the circuit inoperative.

In many pure fluid circuits used for control applications, the primary fluid signal that is available as an input to the system is of a pressure and flow magnitude that does not permit the direct use of this signal as an input to the above-described miniature circuits. Thus, it becomes necessary and desirable to be able to attenuate or reduce such primary fluid signal so that it can be used for processing in a pure fluid circuit.

One form of fluid pressure attenuator that is known comprises a nozzle for generating a free fluid stream and a receiver that is directed toward the nozzle for reception of said fluid stream. It has been proven that the percent of pressure recovery in such a jet recovery attenuator is relatively constant up to 35 p.s.i.g. which means that the effective attenuation is desirably linear over this range. One example of a device that inherently performs the attenuation function is the standard analog amplifier wherein the input signal is considered to be the pressure in the power nozzle and the output signal is considered to be the pressure in the center receiving duct when there are no transverse control signals at the control nozzles. That is to say, the pressure in the center receiving duct of an analog amplifier in a null control signal condition is reduced by a certain proportion from the input pressure in the power nozzle which means that the input pressure has been attenuated to the lower output pressure in the receiving duct due to the total pressure drop that takes place in the interaction region and the receiver of the amplifier.

In an effort to obtain greater pressure reduction, it has been suggested to provide a series of enclosed resistors that take the form of reduced channels connected by enlarged chambers; each channel acts as an orifice restriction in series with the other orifice restrictors. While this arrangement provides a linear pressure attenuation when the working fluid is incompressible, the results are unacceptable when the working fluid is compressible. As a result of compressibility of the working fluid, the ratio of pressure drops of downstream to upstream orifices increases with increased input pressure, so that the attenuation over the range is not linear. This undesirable effect can be calculated and is the result of fluid density change. In other words, at the higher pressures the density of the compressible fluid in a closed resistor is such as to cause less pressure drop in a closed restrictor than is produced in an identical closed restrictor located downstream and in which the density is less and the velocity is greater. It can be seen that, in this prior art type of attenuator when the working fluid is compressible, the gain at the higher pressures is more than at the lower pressures so that over a large range of pressures, such as from one atmosphere to two atmospheres, the loss in pressure is not proportional to input pressure and linear attenuation is not obtained.

Accordingly, it is one object of the present invention to provide a fluid pressure attenuation system of the jet recovery type wherein the attenuation is substantially linear over a substantially large pressure range.

It is another object of the present invention to provide a fluid pressure attenuator which is capable of generating large pressure reductions per unit.

It is still another object of the present invention to provide a pressure attenuator of the type described that is simple in construction and inexpensive to manufacture.

The device of the present invention preferably takes the form of a circuit as shown in the accompanying drawings that is characterized by a flat resistive transfer chamber having one of its flat walls (top or bottom) closed and the other open, a first restricted (closed) channel having an egress or power nozzle on one side of said chamber to generate a fluid stream across said transfer chamber and a second restricted channel having a receiver or ingress orifice, at which the power nozzle is directed, to recover said fluid stream. This invention contemplates that any number of these attenuator units can be connected in series to provide the necessary reduction in pressure and one embodiment of the invention contemplates that the number of series connected units, up to the maximum of the apparatus, may be selected by a plug-in type of arrangement.

It is the fluid flow action within the open-sided transfer chamber of the device of the present invention that causes the gain to remain relatively constant over a large range of pressures. For reasons discussed in greater detail subsequently, the boundary layers of the stream in such a chamber vary with input pressure in such a manner as to reduce the total pressure within the fluid stream as a linear function of input pressure. This action is possible in the present device due to the venting through the open end of the resistive chamber which prevents the static pressure in the center of the chamber from increasing at the higher input pressures. Furthermore, this open-sided construction of the resistive chamber causes increased fluid turbulence in said chamber to produce greater attenuation per unit length than in, for example, an analog amplifier used as an attenuator.

Additionally, in accordance with the present invention, the venting of the fluid stream takes place around a substantial portion (actually three sides) of the fluid stream while the recovery of the fluid stream takes place on the bounded side of the stream along the closed side wall of the resistive chamber. This means that the bounded side of the defined jet is coplanar with and thus guided to the receiver by the closed end wall of the chamber. Further, the higher velocity and less turbulent portions of the jet adjacent said wall are recovered by the receiver whereby the attenuated signal is less noisy than would otherwise be true. In addition, it has been found that the venting of fluid serves to isolate the chamber from outside disturbances. Preferably, the resistive chamber has a cylindrical configuration to minimize reflections from the peripheral walls and thus maintain a reasonable signal-to-noise ratio.

Aclording to naother aspect of the present invention, it has been discovered that a bleed control valve may be provided in the output passage for regulation of the final signal pressure within close tolerance. This is so since the output pressure of the attenuator when employed with pure fluid control circuits is usually below 5 p.s.i.g. and at this low pressure the reduction in pressure by a simple bleed valve is substantially linear.

According to another aspect of the present invention, is provided an attenuator having a series of open-ended resistive chambers connected by flow channels with power means and output means that are readily removable from each of said chambers for selective placement for different gain values.

Thus, it is another object of the present invention to provide a fluid pressure attenuator that has substantially the same pressure reducing or attenuating effect over a large range of pressures.

It is still a further object of the present invention to provide an attenuator of the type described wherein the resistive chamber is formed with an open end to reduce the pressure through a substantial range.

It is still another object of the present inevntion to provide a seriees of open-ended resistive chambers connected by flow channels wherein the input means and the output means can be selectively placed through the open ends of the chambers for selecting the gain desired.

Still other objects and advantages of the present invention will become readily apparent to those skilled in this art from the following detailed description, wherein I have shown and described only the preferred embodiments of the invention, simply by way of illustration of the best modes contempated by me of carrying out my invention. As will be realized, the invention is capable of other and different embodiments, and its several details are capable of modification in various obvious respects, all without departing from the invention. Accordingly, the drawings and description are to regard as illustrative in nature, and not as restrictive.

Referring now to the drawings.

Figures 1, 2, 3, 4, 5:
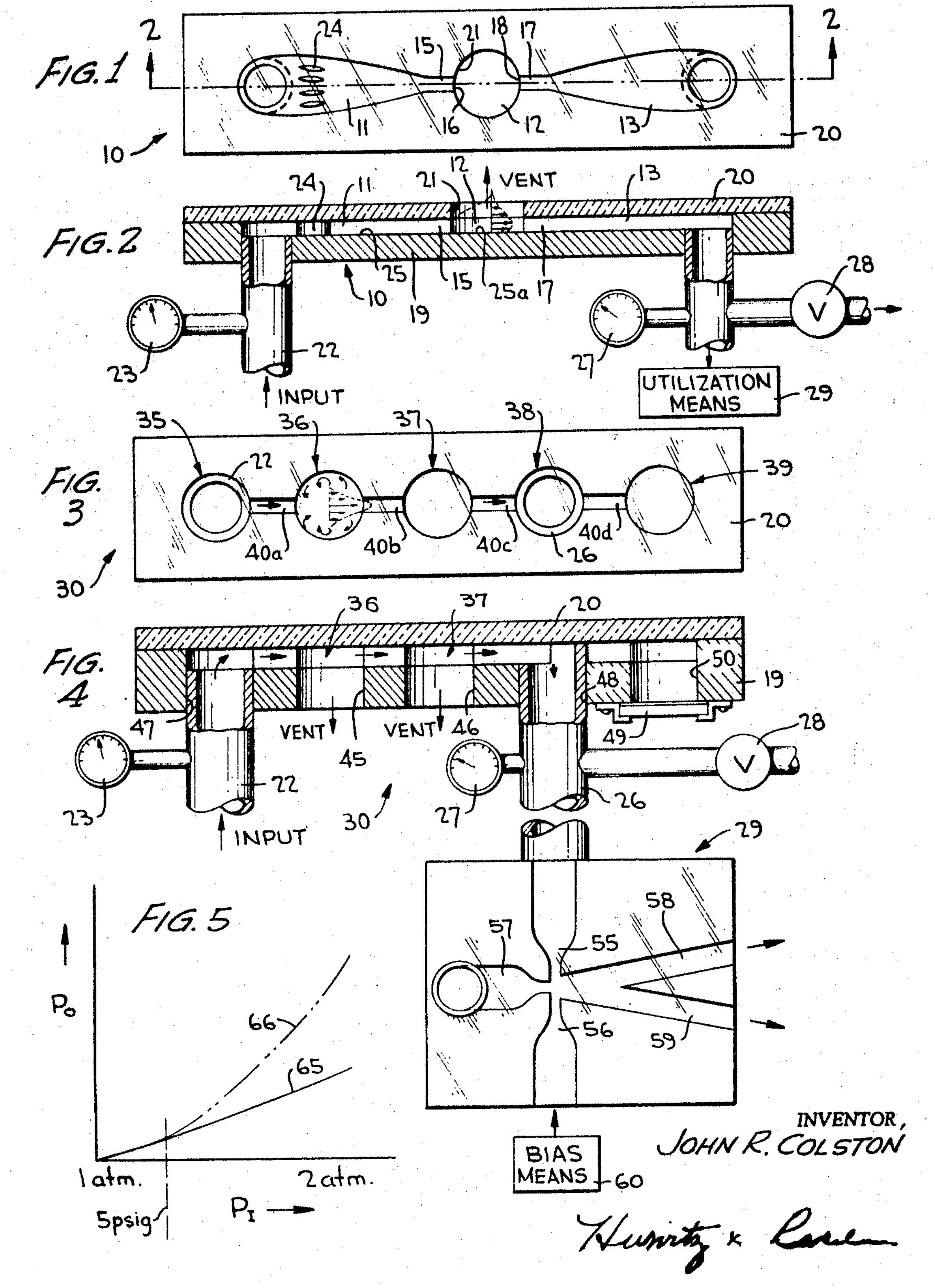
FIGURE 1 is a plan view of one form of an attenuator device constructed in accordance with the present invention.
FIGURE 2 is a cross-sectional view taken along line 2—2 of FIGURE 1.
FIGURE 3 is a plan view of an alternate embodiment of the attenuator device of the present invention.
FIGURE 4 is a cross-sectional view taken along line 4—4 of FIGURE 3.
FIGURE 5 is a graphical representation of the operation of the attenuator of the present invention.

Referring now specifically to FIGURES 1 and 2 of the drawings, there is shown a fluid pressure attenuator, generally represented by the reference numeral 10, comprising an input chamber 11, a resistive transfer chamber 12, and an output chamber 13. The input chamber 11 is connected to the transfer chamber 12 by a restricted channel 15 that terminates in an egress orifice 16 formed in the side of the chamber 12. Likewise, the output chamber 13 is connected to the resistive transfer chamber 12 by a channel 17 having an ingress orifice 18 formed in the side of said transfer chamber 12. As can be seen from viewing FIGURE 1, the ingress orifice 18 is positioned directly opposite the egress orifice 16 so that a fluid flow path is formed along the center line of the attenuator 10.

As can best be seen in FIGURE 2, the chambers 11, 12 and 13 and the connecting channels 15, 17 are preferably etched or machined into a base plate 19. The base plate 19 is covered by a top cover plate 20 which has been illustrated as being transparent to show the outline details of the attenuation circuit of the present invention. In this embodiment, the top cover plate 20 has formed therein a vent aperture 21 for the purpose of venting said chamber to the atmosphere or to a suitable sump (not shown).

An input pipe 22 may be fitted within a hole in the base plate 19 to provide the fluid flow to the attenuation system and a gauge 23 may be provided if desired, to read the input signal. The input chamber 11 is elongated and tapered from the input pipe 22 down to the restricted channel 15 for the purpose of compressing and smoothing the flow of fluid in the system to a substantially uniform state before the fluid reaches the egress orifice 16. If desired, flow straighteners 24 can be mounted on floor 25 of the input chamber 11 to further smooth the fluid flow from the input pipe 22 which has been placed in a perpendicular relationship to the chamber 11 merely for convenience in fabrication. The channel 15 is desirably of sufficient length to finally insure that the smoothing out process of the fluid stream or jet is complete at the orifice 16 where the fluid stream enters the resistive transfer chamber 12.

Opposite the open end of the chamber 12 or the vent aperture 21 is an end wall 25*a* coplanar with the floor 25 of the input chamber 11. Thus, as the high pressure fluid stream traverses diametrically across the resistive chamber 12, one side of the stream engages the end wall 25*a* which guides the high velocity portions of the stream into the opposed ingress orifice 18 and thence into the restricted channel 17 and the output chamber 13. Provided at the terminal end of the output chamber 13 is an output pipe 26 which may include a pressure gauge 27 for measuring the attenuated output signal. A variable bleed valve 28 may be provided to regulate the final output signal pressure before the fluid is delivered to a utilization means 29.

To explain the overall operation of the attenuator 10, assume that the input pipe 22 is connected to the primary signal which is desired to be attenuated so that fluid flows past the flow straighteners 24 and down the tapered input channel 11 and thence to the restricted channel 15. As a result of this, a defined high pressure stream of fluid is emitted from the egress orifice 16 into the resistive transfer chamber 12 as described above. As the stream traverses the chamber 12, the boundary layer regions around a substantial portion of said stream are broken down and become turbulent so that the total pressure in the stream is reduced in a well-known manner.

In accordance with teachings of the invention and as illustrated by the vectorial diagram in FIGURE 2, the fluid stream as it traverses the chamber 12 expands into the vent region and the semi-circular regions of the chamber 12. In consequence, only fully expanded fluid directly in line with channel 17 enters the channel and no compression of the fluid occurs upon being reconfined.

The pressure drop between the orifices 16 and 17 is determined by the characteristics of a free turbulent jet and thus the distance between the orifices is the factor determining pressure drop of the system. The distance cannot be too great so that the free set retains its integrity. As ratio of orifice width to orifice displacement of 10 to 1 in a system having an aspect ratio of 2 to 1 is considered appropriate.

Considering again the vector diagram of FIGURE 2, the greatest reduction in velocity is experienced adjacent the open end of said chamber 12 and the higher velocity fluid adjacent the closed end of the chamber 12 is received by the ingress orifice 18 of the channel 17. As will be apparent from this vectorial diagram, the lower velocity fluid adjacent the open end of the chamber 12 advantageously serves to form a protective cover across the open end of the chamber 12 for the higher velocity fluid that is to be recovered in the ingress orifice 18 as the attenuated fluid signal. This feature of the invention prevents interferences from the outside from affecting the fluid stream and since only the higher velocity fluid adjacent the end wall 25*a* is recovered, the noise level in the fluid signal is maintained at a minimum level.

Further, as pointed out above, the closed side 25*a* of the chamber 12 is coplanar with one side of the stream of fluid so that the stream is directed toward the ingress orifice 18 by positive means. This arrangement also insures that the higher velocity, low noise fluid enters the ingress orifice 18 since, as can be seen from the velocity diagram in FIGURE 2, there is substantially less reduction in the velocity adjacent that side of the stream which is in juxtaposition to the closed side of the chamber 12.

After the fluid stream has been recovered through the ingress orifice 18, it is passed through the restricted channel 17 to smooth out any of the disturbances which have been gathered during the attenuation process in the transfer chamber 12, and then the fluid is passed into the output chamber 13 for delivery to the output pipe 26 for delivery to the utilization means 29, such as a control circuit or the like.

The system of FIGURES 3 and 4 is generally like that of FIGURES 1 and 2, with the basic difference that a plug-in type of arrangement is incorporated in an attenuator 30 to provide for selective attenuation of a fluid signal. In this embodiment there is provided a series of resistive chambers, generally designated by the reference numerals 35, 36, 37, 38 and 39, which are connected by identical restricted channels 40*a*–40*d*, respectively. As before, the center line of the attenuator 30 forms a flow path for the fluid that enters via the input pipe 22 and is withdrawn at the output pipe 26.

The pressure reducing turbulence caused in each of the resistive chambers 35–39 is substantially the same as has been described in relation to the resistive chamber 12 so that the same general advantages attach to this embodiment as have been described above. As will be remembered, the two side walls of the resistive chambers 35–39 generate eddy currents to aid in attenuating the pressure in the stream as it travels diametrically across said chambers 35–39. This action can be viewed by referring to the vectorial representation illustrated in chamber 36 of FIGURE 3 where it can be seen that the outer boundary layer regions are removed from the higher velocity center core of the stream as it enters the ingress orifice of the restricted channel 40*b* and this fluid from the boundary layer regions is fed back in a reentrant fashion along the stream.

With specific reference to FIGURE 4, it can be seen that the embodiment of the invention has vent apertures 45, 46, associated with the transfer chambers 36, 37, respectively, for the purpose of venting the fluid of the stream to the atmosphere or to a sump (not shown) in the same manner as before. One difference will be noted in that the vent apertures 45, 46 are formed in the base plate 19 in this embodiment rather than in the cover plate 20 and that vent apertures 47, 48 associated with the resistive chambers 35, 38, respectively, are utilized to connect the input pipe 22 and the output pipe 26, respectively, to the system. Also, it will be noted that an end cap 49 is required to be securely fastened over a final vent aperture 50 which is associated with the treminal tranfer chamber 39 to prevent escape of fluid at this point in the particular selective set up shown in these figures.

Since the two resistive chambers 36, 37 are vented in this embodiment, the attenuation effected is substantially double the attenuation obtained if only one of the chambers was vented. Thus, as the flow of fluid progresses through the chamber 36, attenuation will take place with the defined fluid stream being recovered by the restricted channel 40*b* whereupon the recovered stream is passed through the subsequent vented chamber 37 for additional attenuation. The higher velocity portions of the stream are then recovered by the restricted channel 40*c* for delivery through the chamber 38 to the output pipe 26.

As above indicated, one feature of this embodiment is that the input and output pipes 22, 26 are readily removable from the vent apertures 47, 48, respectively, for selective placement in any of the other vent apertures 45, 46, 50 to effect different gains in the overall system. For example, if the output pipe 26 is placed in the vent aperture 46 instead of the vent aperture 48 and an additional end cap is placed over the vent aperture 48, then the gain of the system would be reduced since in this case only one chamber (that is, chamber 36) would be vented to effect attenuation. On the other hand, of course, attenuation could be effectively increased by placement of the output pipe 26 in the vent aperture 50 whereupon the three resistive chambers 36, 37, 38 would be effective to attenuate the fluid pressure signal. One requirement in the use of this embodiment of the invention is that at least one chamber be positioned between the input and output pipes 22, 6 so that linear attenuation will be effected in accordance with the teachings of the invention.

The utilization means 29 of this embodiment is or may be a standard proportional amplifier which has a control nozzle 55 connected to the output pipe 26, an opposed control nozzle 56, a power nozzle 57, and a pair of output ducts 58, 59. A bias means 60 may be connected to the control nozzle 56 for opposing the effect of the fluid signal from the control nozzle 55 in such a manner that the power stream from the power nozzle 57 is divided between the output ducts 58, 59 in accordance with the signal being received from the attenuator 10.

FIGURE 5 shows a graphical representation of the action of the attenuators 10, 30 of the present invention as compared to one or a series of closed resistive chambers of the prior art. Thus, it can be seen that the solid line 65 illustrates the linearity of the gain (*dPo/dPi*) of the system of the present invention; whereas, the dotted line 66 illustrates the nonlinearity of the operation of the prior art system. As can be realized from studying this graph, by properly designing the several components of the attenuator 10 of the invention, the desired low pressure signal for operating the pure fluid utilization means 29 may be obtained without encountering the disadvantages of the prior art.

For example, it has been found by experimentation that the fluid attenuator 10, 30 constructed in accordance with this invention may, by properly selecting the size of the components, be effective to attenuate an input fluid signal so as to have a uniform gain of approximately 0.15 over a range of pressures from 2–16 p.s.i.g. This means that the utilization means 29 receives a signal that is proportional to the input signal over the entire range of pressures. Furthermore, it can be noted from these curves of FIGURE 5 that the degree of attenuation over the range illustrated is substantially greater than that obtainable in the prior art system, i.e. the gain (*dPo/dPi*) of the system of the present invention is advantageously less than the prior art system and the attenuation process using the device of the present invention is therefore more efficient.

It will be remembered that the bleed control valve 28 is effective to reduce and further regulate the final output pressure after said output pressure has been attenuated to within the range of approximately 0–5 p.s.i.g., as can be seen form the fact that the curves 65, 66 (FIGURE 5) are substantially coextensive within this range of pressures. Thus, during operation with fluid flowing in the system and the pressure within the output pipe 26 reduced to 5 p.s.i.g. or less, the final adjustment can be effected by operation of the valve 28 until the reading on pressure gauge 27 is at the desired point. Furthermore, it was in fact found that the use of the valve 28 to adjust the final output pressure is desirable to offset the slight tendency for the gain of the attenuator 10 in the designated lower range to be greater than the gain in the upper ranges since, as is well known in the art, in the simple bleed type gain control just the reverse is true which is that the minimum gain occurs at minimum pressure.

Results and advantages of the system of the present invention should now be apparent since the primary high pressure input signal available in the input pipe 22 may be linearly attenuated through one or any number of stages for direct interconnection to a pure fluid circuit for any desired control or other purpose. For example, in the embodiment just described the fluid pressure is linearly attenuated through two stages at the resistive chambers 36, 37 and then applied to the pure fluid amplifier 29 in such a manner as to accurately represent the primary signal.

What I claim is:

1. A fluid pressure attentuator of the jet recovery type, comprising an input chamber, a resistive transfer chamber having one end closed and the other end open, a first restricted channel connecting said input chamber to said transfer chamber, said first channel having an egress orifice on one side of said transfer chamber, an output chamber, a second restricted channel connecting said transfer chamber to said output chamber, said second channel having an ingress orifice on the opposite side of said transfer chamber, said chambers and said channels forming a fluid flow path through said system, and power means for supplying fluid to said input chamber to generate a defined stream of fluid from said egress orifice of said first channel into said transfer chamber, said egress orifice of said second channel being directed toward said egress orifice to receive said stream of fluid after the same has passed across said transfer chamber, said open end forming vent means for said chamber whereby linear attenuation of the fluid pressure in said stream over a large range of pressures may be effected, said transfer chamber being of substantially cylindrical configuration and said stream being directed diametricaly across said chamber whereby eddy currents are created on two sides of said stream by the opposite sides of said cylinder to aid in attenuating the fluid pressure in said defined stream.

2. The combination of claim 1 wherein is further provided adjustable bleed means connected to said output chamber for regulating the amount of attenuation.

3. The combination of claim 1 wherein the closed end of said transfer chamber is substantially coplanar with one side of said channels for guiding said stream of fluid through said chamber.

4. The combination of claim 1 wherein the sides of said input chamber and said output chamber are sloped inwardly to said first and second channels, respectively, and flow straighteners are provided in said input chamber to aid in smoothing said stream of fluid.

5. A fluid pressure attenuator of the jet recovery type comprising a plurality of resistive transfer chambers having one end closed and one end open, a plurality of restricted channels connecting said chambers in series to form a fluid flow path through said system, each of said channels having an ingress and egress orifice formed in the respective sides of said chambers, said ingress orifice of each channel being directed toward the egress orifice of the preceding channel, said open end forming vent means for each of said transfer chambers, power means for supplying fluid through the vent means of a first of said chambers for delivery as a defined stream through said channels and through each succeeding transfer chamber, output means for receiving said fluid through the vent means of a second of said chambers, said second-chamber being separated from said first chamber by at least one other of said chambers for venting said stream whereby linear attenuation of the total fluid pressure in said stream over a large range of pressures may be effected.

6. The combination of claim 5 wherein said power means and said output means are readily removable from each of said vent means for selective placement for different gain values.

7. The combination of claim 5 wherein each of said transfer chambers is substantially of cylindrical configuration and said stream is directed diametrically across said chamber whereby eddy currents are created on two sides of said stream by the opposite sides of said cylinder to aid in attenuating the fluid pressure in said defined stream.

8. The combination of claim 5 wherein is further provided adjustable bleed means connected to said output chamber for regulating the amount of attenuation.

9. A fluid pressure attenuation system of the jet recovery type, comprising a restricted input channel, a resistive transfer chamber having one end closed and the other end open, said input channel having an egress orifice on one side of said transfer chamber, a restricted output channel, said output channel having an ingress orifice on the opposite side of said transfer chamber, said chamber and said channels forming a fluid flow path through said system, and power means for supplying fluid to said input channel to generate a defined stream of fluid from said egress orifices into said transfer chamber, said ingress orifice of said output channel being directed toward said egress orifice to reecive said stream of fluid after the same has passed across said transfer chamber, the closer end of said chamber being substantially co-planar with one side of said channels for guiding said stream of fluid through said chamber, said open end of said chamber forming vent means for said chamber whereby linear attenuation of the fluid pressure in said stream over a large range of pressures may be effected.

10. A fluid pressure attenuator of the jet recovery type for attenuatiing an input pressure signal applied thereto, said attenuator comprising:

a chamber having a fluid input port and a fluid output port disposed in substantial alignment, a closed end, an open end opposite said closed end, said closed end being defined by an endwall having a surface interior of said chamber which extends between said input and output ports, said open end being exposed to an ambient pressure environment;

input means responsive to application of said input pressure signal thereto for issuing a fluid stream into said chamber via said input port and along said interior surface of said endwall toward said output port;

wherein the distance between said input and output ports is sufficient to permit spreading of said stream in all directions parallel to and away from said interior surface of said endwall, and wherein said output port is sufficiently small to receive only a portion of said stream when so spread; and output means for recovering pressurized fluid received by said output port.

11. The combination according to claim 10 wherein said output port is defined through a wall of said chamber, said wall being configured to generate fluid eddy currents in the portions of said fluid stream which are not received by said output port.

12. The combination according to claim 11 wherein said chamber is of substantially cylindrical configuration, and wherein said input and output ports are in diametric alignment across said chamber.

13. The combination according to claim 12 further output means for selectively venting portions of the pressurized fluid recovered by said output means.

14. The combination according to claim 12 further comprising:

a second chamber of substantially identical configuration to said first-mentioned chamber;

fluid passage means connected to said output means and responsive to fluid pressure recovered by said output means for issuing a stream of fluid into said second chamber via the input port of said second chamber and along the interior surface of the side-chamber and along the interior surface of the endwall of said second chamber toward the output port of the second chamber; and further output means for recovering pressurized fluid received by the output port of said second chamber.

15. A fluid pressure attenuator of the jet recovery type for attenuating an input pressure signal applied thereto, said attenuator comprising:

a plurality of chambers, each having a fluid input port and a fluid output port disposed in substantial alignment, a closed end, an open end opposite said closed end, said closed end being defined by an endwall having a surface interior of the chamber and extending between said input and output ports, said open end being adapted for exposure to an ambient pressure environment;

a plurality of input means, one each connected to the input port of a respective one of said plurality of chambers, each said input means being responsive to application of pressurized fluid thereto for issuing a stream of fluid into its associated chamber via the input port of that chamber and along the interior surface of that chamber toward the output port of that chamber;

wherein the distance between said input and output ports is sufficient to permit spreading of a fluid stream directed therebetween, said spreading being in all directions parallel to and away from the interior surface of said endwall, and wherein said output port is sufficiently small to receive only a portion of said stream when so spread;

fluid passage means for sequentially interconnecting said chambers, said fluid passage means being disposed to recover pressurized fluid received at the output port for each chamber and to apply the pressurized fluid so recovered to the input means for the next sequential chamber;

means for applying said input pressure signal to the input means of the first chamber in said sequentially interconnected chambers; and insert means, adapted for insertion into the open end of any of said plurality of chambers for conducting substantially all of the pressurized fluid received by that chamber through the open end of that chamber as the output pressure signal for said attenuator.

16. The combination according to claim 15 wherein said chambers have a substantially cylindrical configration, and wherein said input port and said output port are in diametric alignment across each chamber.

17. The combination according to claim 16 wherein said insert means is of substantially cylindrical configuration and of such size to fit into the open end of any of said chambers.

18. The combination according to claim 17 further comprising adjustable bleed means connected to said insert means for selectively venting portions of the output pressure signal received by said insert means.

References Cited

UNITED STATES PATENTS

| | | | |
|---|---|---|---|
| 2,731,984 | 1/1956 | Everett | 138—30 |
| 3,122,165 | 2/1964 | Horton | 137—81.5 |
| 3,182,674 | 5/1965 | Horton | 137—81.5 |
| 3,185,166 | 5/1965 | Horton, et al. | 137—81.5 |
| 3,191,612 | 6/1965 | Philips | 137—81.5 |
| 3,270,960 | 9/1966 | Phillips | 137—81.5 XR |
| 3,279,489 | 10/1966 | Bjornsen et al. | 137—81.5 |
| 3,285,263 | 11/1966 | Bjornsen et al. | 137—81.5 |
| 3,362,421 | 1/1968 | Schaffer | 137—81.5 |
| 3,061,039 | 10/1962 | Peters | 138—30 |

OTHER REFERENCES

"Multiple or Pneumatic Logic Element," R. E. Norwood, I.B.M. Technical Disclosure Bulletin, vol. 7, No. 6, November 1964, p. 460 (copy in grp. 360, 137-81.5 and Scien. Lib.).

SAMUEL SCOTT, Primary Examiner